(12) United States Patent
Ku

(10) Patent No.: US 10,574,124 B2
(45) Date of Patent: Feb. 25, 2020

(54) FIELD WINDING TYPE MOTOR

(71) Applicant: MANDO CORPORATION, Gyeonggi-do (KR)

(72) Inventor: Hyun Ku, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 449 days.

(21) Appl. No.: 15/629,752

(22) Filed: Jun. 22, 2017

(65) Prior Publication Data

US 2017/0373553 A1    Dec. 28, 2017

(30) Foreign Application Priority Data

Jun. 22, 2016  (KR) .......................... 10-2016-0077950

(51) Int. Cl.

| | | |
|---|---|---|
| *H02K 19/12* | (2006.01) | |
| *H02K 3/34* | (2006.01) | |
| *H02K 11/00* | (2016.01) | |
| *H02K 19/38* | (2006.01) | |
| *H02K 1/02* | (2006.01) | |

(52) U.S. Cl.
CPC ............. *H02K 19/12* (2013.01); *H02K 3/345* (2013.01); *H02K 11/0094* (2013.01); *H02K 19/38* (2013.01); *H02K 1/02* (2013.01)

(58) Field of Classification Search
CPC .... H02K 3/345; H02K 11/0094; H02K 19/12; H02K 19/38; H02K 1/02
See application file for complete search history.

(56) References Cited

U.S. PATENT DOCUMENTS 4,612,486 A * 9/1986 Ban ........................ H02K 29/12
310/113

FOREIGN PATENT DOCUMENTS

KR    10-2016-0127944    11/2016

* cited by examiner

*Primary Examiner* — Mohamad A Musleh
(74) *Attorney, Agent, or Firm* — Ladas & Parry, LLP

(57) ABSTRACT

Provided is a field winding type motor capable of having high efficiency and reinforcing a portion having low stiffness during high speed rotation by respectively assembling metal cores in axial directions of a stator bobbin and a rotor bobbin.

10 Claims, 4 Drawing Sheets

FIELD WINDING TYPE MOTOR

CROSS-REFERENCE(S) TO RELATED APPLICATION

This application claims the benefit of Korean Patent Application No. 10-2016-0077950, filed on Jun. 22, 2016, in the Korean Intellectual Property Office, the disclosure of which is incorporated herein in its entirety by reference.

BACKGROUND OF THE INVENTION

Field of the Invention

The present invention relates to a field winding type motor, and more particularly, to a field winding type motor capable of having high efficiency and reinforcing a portion having low stiffness during high speed rotation by respectively assembling metal cores in axial directions of a stator bobbin and a rotor bobbin.

Description of the Related Art

Generally, a rotary is installed in a field winding type motor so as to rotate a shaft of a rotor during an application of a current by respectively winding coils around a stator and the rotor.

The rotary includes a stator bobbin and a rotor bobbin. The stator bobbin is coupled to the stator and includes a primary stator core installed therein, and the rotor bobbin is rotatably installed in the stator bobbin in a state of being coupled to the rotor and includes a secondary rotor core installed therein.

The primary stator core and the secondary rotor core are formed by processing a magnetic powder (soft magnetic composite (SMC)) in a certain shape and are applied to the stator bobbin and the rotor bobbin.

The rotary has a driving method in which, when a current is applied to the primary stator core, a magnetic flux is generated in the primary stator core and the secondary rotor core and an induced current is generated so as to rotate the secondary rotor bobbin.

A primary stator core and a secondary rotor core of an existing field winding type motor have been made of an SMC material. However, since the SMC material has high brittleness and low strength, the existing field winding type motor has been vulnerable to an external impact when applied to a motor driven in a high rotation region.

As one of prior art documents related to the present invention, Korean Patent Application Publication No. 10-2016-0127944 (published on Nov. 7, 2016) discloses a motor for a vehicle.

SUMMARY OF THE INVENTION

An aspect of the present invention is directed to provide a field winding type motor capable of reinforcing a portion having low stiffness during high speed rotation by respectively assembling different material cores using a metal material in axial directions of a stator bobbin and a rotor bobbin, thereby securing high efficiency and stiffness with respect to an external impact.

Another aspect of the present invention is directed to provide a field winding type motor capable of having easy of assembly and improving coupling strength between a rotor core and a rotor by assembling a core and a rotor cover using a metal material in an axial direction of a housing through a coupling member.

According to an embodiment of the present invention, a field winding type motor includes: a rotor rotatably coupled in a hollow of a housing; a first stator core coupled along an inner peripheral surface of the housing; a first rotor core coupled along an outer peripheral surface of the rotor in a state of being spaced apart from an inner peripheral surface of the first stator core; a bobbin assembly coupled along a gap between the first stator core and the first rotor core and generating a magnetic flux when power is applied thereto; a second stator core fixedly disposed on an one side of the bobbin assembly in an axial direction in a state of being coupled along the inner peripheral surface of the first stator core; and a second rotor core disposed on the other surface of the bobbin assembly so as to correspond to the second stator core and rotated together with the first rotor core when the power is applied to the bobbin assembly.

The bobbin assembly may include: a stator bobbin coupled along the inner peripheral surface of the first stator core and including stator coils wound therearound; and a rotor bobbin rotatably disposed within an inner diameter of the stator bobbin in a state of being coupled along an outer peripheral surface of the first rotor core and including rotor coils wound therearound.

The rotor may include: a shaft installed to be rotatable on a central axis line of the hollow; and a rotor cover coupled to the outer peripheral surface of the rotor and supporting one surface of the second rotor core in an axial direction toward the bobbin assembly.

The rotor cover may include: a cover body coupled along a gap between the shaft and the first rotor core in an axial direction of the housing; and a support part bent in a radial direction of the shaft from one end in an axial direction of the cover body and closely contacting one surface of the second rotor core in an axial direction.

The second rotor core and the support part may be coupled through a coupling member, and the coupling member may be screw-coupled to the second rotor core and the support part in an axial direction thereof.

The rotor cover may have a support protrusion protruding along a connection portion between an outer peripheral surface of the cover body and the support part, and one surface of the support protrusion in an axial direction closely may contact one surface of the first rotor core in an axial direction and an outer peripheral surface of the support protrusion may support an inner peripheral surface of the second rotor core, so that the first rotor core and the second rotor core are spaced apart from each other in the axial direction thereof.

A stator cover may be further coupled to one surface of the housing in the axial direction, the support part being disposed on an inner peripheral surface of the stator cover, and one surface of the stator cover in an axial direction may closely contact one surface in an axial direction of the first stator.

A material of the second stator core and the second rotor core may be different from a material of the first stator core and the first rotor core.

A material of the second stator core and the second rotor core may have a relatively higher strength than that of a material of the first stator core and the first rotor core.

The first stator core and the first rotor core may include a soft magnetic composite (SMC) material, and the second stator core and the second rotor core may include a stainless material.

DETAILED DESCRIPTION OF EMBODIMENTS

Hereinafter, preferred embodiments of the present invention will be described in detail with reference to the accompanying drawings.

The above and other aspects, features, and advantages of the present invention will become apparent from the detailed description of the following embodiments in conjunction with the accompanying drawings.

However, it should be understood that the present invention is not limited to the following embodiments and may be embodied in different ways, and that the embodiments are provided for complete disclosure and thorough understanding of the invention by those skilled in the art. The scope of the present invention is defined by the appended claims.

Detailed descriptions of well-known elements will be omitted since they would unnecessarily obscure the subject matters of the present invention.

In a detailed description of the present invention, description of details apparent to those skilled in the art will be omitted for clarity.

Figure 1:
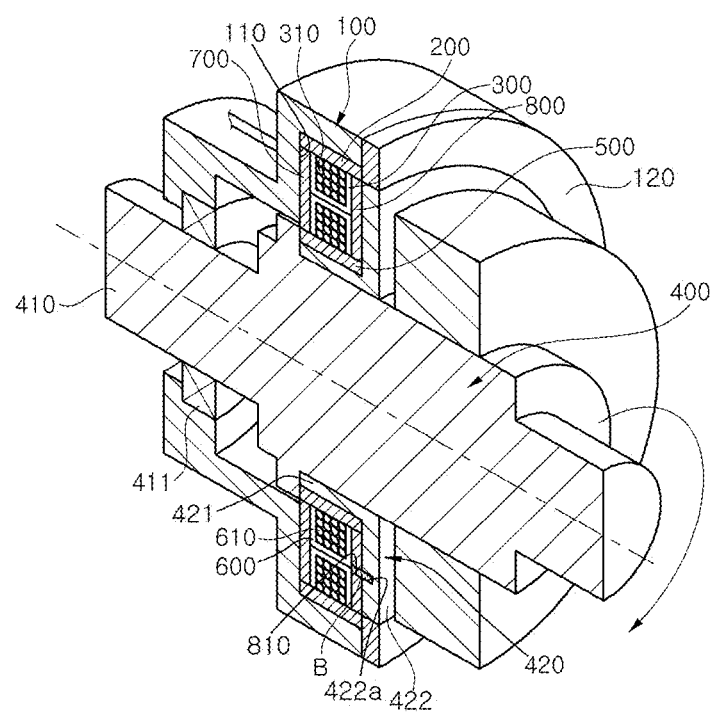
FIG. 1 is a perspective view of a field winding type motor according to the present invention.
Figure 2:
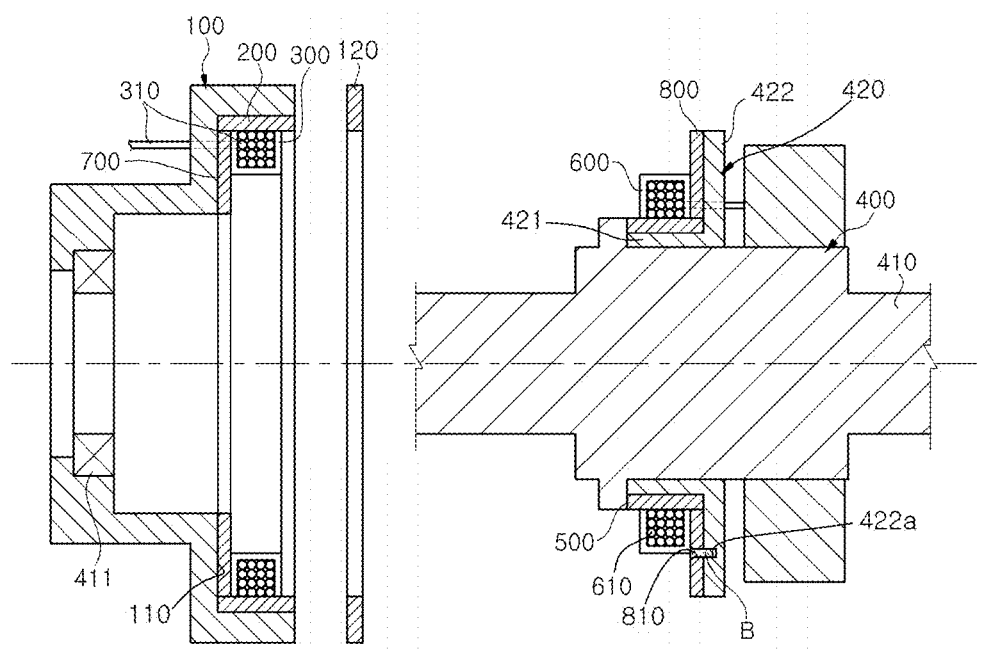
FIG. 2 illustrates an exploded cross-sectional view of the field winding type motor according to the present invention.

FIG. 1 is a perspective view of a field winding type motor according to the present invention, and FIG. 2 is an exploded cross-sectional view of the field winding type motor according to the present invention.

Figure 3:
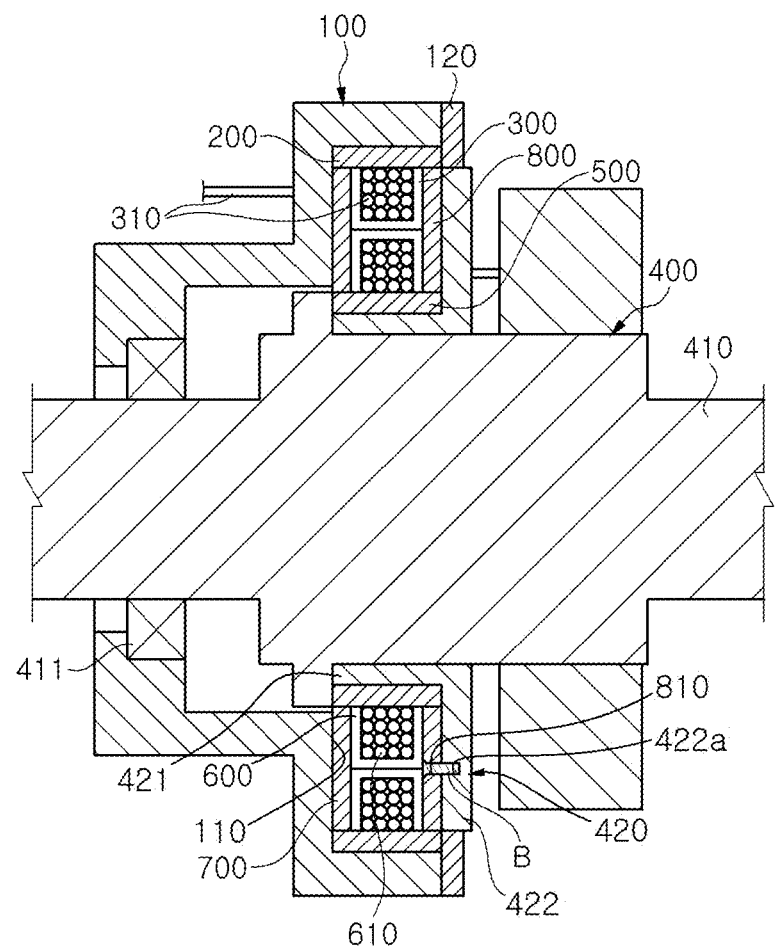
FIG. 3 is an assembled cross-sectional view of the field winding type motor according to the present invention.
Figure 4:
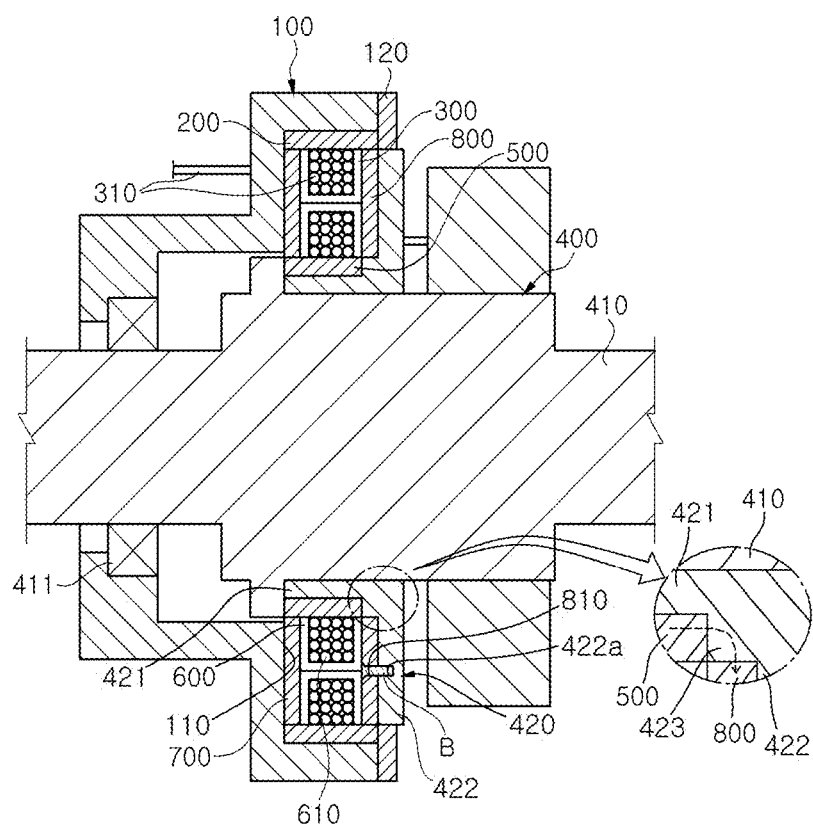
FIG. 4 is an assembled cross-sectional view illustrating a state in which a support protrusion is formed in the field winding type motor according to the present invention.

In addition, FIG. 3 is an assembled cross-sectional view of the field winding type motor according to the present invention, and FIG. 4 is an assembled cross-sectional view illustrating a state in which a support protrusion is formed in the field winding type motor according to the present invention.

Referring to FIGS. 1 to 4, the field winding type motor according to the present invention includes a housing 100, a first stator core 200, a stator bobbin 300, a rotor 400, a first rotor core 500, a rotor bobbin 600, a second stator core 700, and a second rotor core 800.

First, the housing 100 forms an appearance of the field winding type motor, has a cylindrical shape, and has a hollow penetrating in an axial direction thereof.

The housing 100 has a front hollow having a relatively small diameter in a front side and a rear hollow having a relatively large diameter in a rear side, each of which penetrates the housing 100 in the axial direction thereof.

In the housing 100, a stepped portion 110 is formed due to a diameter difference between the front hollow and the rear hollow. A side surface of the stepped portion 110 is formed toward the rear of the housing 100.

In addition, the stepped portion 110 may be continuously formed in a circumferential direction of the housing 100, and a rear surface of the second stator core 700 described later is coupled to the side surface of the stepped portion 110 in a state of being closely contacted.

The first stator core 200 has a ring shape in which a hollow is formed therein, and an outer peripheral surface of the first stator core 200 is coupled to an inner peripheral surface of the housing 100 in a state of being closely contacted.

It is preferable that the first stator core 200 has a ring shape that is larger in an axial direction than in a radial direction. However, the shape of the first stator core 200 may be adjusted as needed.

A ring-shaped stator cover 120, in which a hollow is formed therein, is further coupled to one end in the axial direction of the housing 100, as illustrated in FIGS. 1 and 3.

The stator cover 120 closely contacts and supports one end in an axial direction of the first stator core 200 from the outside, and an inner peripheral surface of the stator cover 120 closely contacts an outer peripheral surface of a support part 422 described later.

Since the stator cover 120 prevents one end of the first stator core 200 from being exposed to the rear of the housing 100, the stator cover 120 may prevent powders of the first stator core 200 from being scattered during high speed rotation.

In addition, a bearing 411 for rotatably supporting a shaft 410 in a radial direction of the shaft 410 described later is installed in the front hollow of the housing 100.

The stator bobbin 300 has a ring shape in which a hollow is formed therein, and an outer peripheral surface of the stator bobbin 300 is coupled to an inner peripheral surface of the first stator core 200.

A plurality of stator coils 310 having a wire shape are wound around the stator bobbin 300 such that power is supplied from the outside.

In this case, a cross section of the stator bobbin 300 in a radial direction may have a polygonal shape in which a front surface, a rear surface, an inner peripheral surface, and an outer peripheral surface thereof are flat. The rotor bobbin 600 described later is rotatably disposed on the inner peripheral surface of the stator bobbin 300 in a shape corresponding to the stator bobbin 300.

The rotor 400 may be rotatably coupled to penetrate the hollow of the housing 100 in the axial direction of the housing 100 and may include the shaft 410 and a rotor cover 420.

The shaft 410 is installed to rotate on a central axis line in the hollow of the housing 100, and a front end of the shaft 410 is rotatably supported to an inner peripheral surface of the bearing 411.

The rotor cover 420 is divided into a cover body 421 and the support part 422.

The cover body 421 has a ring shape in which a hollow is formed therein, and is coupled along a gap between the shaft 410 and the first rotor core 500 in the axial direction of the housing 100.

The support part 422 is bent at a right angle from one end in an axial direction of the cover body 421 and extends in a radial direction of the shaft 410, and one end of the second rotor core 800 described later in an axial direction closely contacts the support part 411.

The support part 422 has a ring shape in which a hollow is formed therein, and is integrally coupled to a rear surface of the second rotor core 800 described later through a coupling member B.

The first rotor core 500 has a ring shape in which a hollow is formed therein, and is coupled to an outer peripheral surface of the rotor 400 in a state of being spaced apart from an inner peripheral surface of the first stator core 200.

It is preferable that the first stator core 200 and the first rotor core 500 are made of a soft magnetic composite (SMC) material.

The rotor bobbin 600 has a ring shape in which a hollow is formed therein, and is rotatably disposed within an inner diameter of the stator bobbin 300.

The first rotor core 500 described above is coupled to an inner peripheral surface of the rotor bobbin 600, and a plurality of rotor coils 610 having a wire shape are wound around the rotor bobbin 600.

For example, when an AC current flows into the stator coils (primary side) 310 of the stator bobbin 300, a magnetic flux is generated in the rotor bobbin 600 and an induced current is generated in the rotor coils (secondary side) 610.

The second stator core 700 has a ring shape in which a hollow is formed therein, and one surface of the second stator core 700 in an axial direction is coupled to a side surface of the stepped portion 110 described above.

The second stator core 700 may be formed such that a width in a radial direction thereof is relatively wider than a width in an axial direction thereof, and a front surface of the second stator core 700 is disposed adjacent to one surface of each of the stator bobbin 300 and the rotor bobbin 600 in the axial direction.

A material of the second stator core 700 is different from a material of the first stator core 200, and it is preferable that the material of the second stator core 700 has a relatively higher strength than that of the material of the first stator core 200.

It is preferable that the second stator core 700 is made of a stainless material having relatively high strength. However, the second stator core 700 may selectively use various metal materials as needed.

The second rotor core 800 is coupled to an outer peripheral surface of the rotor 400 and is rotated together with the rotor 400 in a state in which a front surface of the second rotor core 800 is disposed adjacent to one surface of each of the stator bobbin 300 and the rotor bobbin 600 in the axial direction.

The second rotor core 800 is formed such that a width in a radial direction thereof is relatively wider than a width in an axial direction thereof, and one surface of the second rotor core 800 in the axial direction is disposed adjacent to one surface of each of the stator bobbin 300 and the rotor bobbin 600 in the axial direction.

A material of the second stator core 800 is different from a material of the first rotor core 500, and it is preferable that the material of the second rotor core 800 has a relatively higher strength than that of the material of the first rotor core 500.

It is preferable that the second rotor core 800 is made of a stainless material having high abrasion resistance. However, the second rotor core 800 may selectively use various metal materials as needed.

In addition, the second rotor core 800 may be coupled to the support part 422 of the rotor cover 420 through the separate coupling member B.

To this end, a coupling hole 810, to which the coupling member B is penetration-coupled, may be formed in the second rotor core 800 in the axial direction of the second rotor core 800.

In addition, a coupling groove 422a, to which the coupling member B is coupled, may be formed on one surface of the support part 422 corresponding to the second rotor core 800 in the axial direction of the second rotor core 800.

One end of the coupling member B may be screw-coupled to the coupling hole 810 and the coupling groove 422a to connect the second rotor core 800 and the support part 422.

In this state, since the support part 422 of the rotor cover 420 coupled to an outer peripheral surface of the shaft 410 supports one surface of the second stator core 800 in the axial direction, an assembled state of the second rotor core 800 is stably maintained.

As described above, the second rotor core 800 uses a stainless material or the like having high strength. Therefore, in a case where the second rotor core 800 is coupled to the support part 422 through the coupling member B, the second rotor core 800 is not easily damaged or deformed even when an external force is applied in a high speed rotation region.

For example, after the first stator core 200, the first rotor core 500, the second stator core 700, the stator bobbin 300, the rotor bobbin 600, and the second rotor core 800 are assembled in the axial direction from the rear of the housing 100, the second rotor core 800 and the support part 422 of the rotor cover 420 may be coupled though the coupling member B.

On the other hand, as illustrated in FIG. 4, a support protrusion 423 may protrude along a connection portion between an outer peripheral surface of the cover body 421 and the support part 422.

The support protrusion 423 may be continuously formed along a circumferential direction of the rotor cover 420 or may be formed in plurality in the circumferential direction of the rotor cover 420.

As described above, one surface of the support protrusion 423 in an axial direction closely contacts one surface of the first rotor core 500 in an axial direction. An outer peripheral surface of the support protrusion 423 supports an inner peripheral surface of the second rotor core 800 described later and allows the first rotor core 500 and the second rotor core 800 to be spaced apart from each other in the axial direction thereof.

At this time, since one end of the first rotor core 500 in the axial direction is disposed in a front of the second rotor core 800, the first rotor core 500 and the second rotor core 800 are not connected to each other.

A rear surface of the first rotor core 500 supported to the support protrusion 423 may be disposed in parallel to a front surface of the second rotor core 800 in a radial direction of the shaft 410.

In addition, an inner peripheral surface of the second rotor core 800 may be disposed in parallel to an outer peripheral surface of the first rotor core 500 in an axial direction of the shaft 410.

Furthermore, the first rotor core 500 may be wound around an outer peripheral surface more than once, and thus, the first rotor core 500 may be formed with one or more layers.

In addition, the support protrusion 423 may be made of a non-directional material such that the directionality (orthogonal direction) of the magnetic flux is maintained when a magnetic flux having directionality is curved in an orthogonal direction.

That is, since the support protrusion 423 is applied as the non-directional material in a section in which the magnetic flux is curved in the orthogonal direction, the support protrusion 423 may maintain the directionality of the magnetic flux. Since the directionality of the magnetic field is maintained, the first rotor core 500 may be made of various materials (iron and the like) having directionality.

As a result, according to the present invention, a portion having low stiffness during high speed rotation may be reinforced by respectively assembling the second stator core 700 and the second rotor core 800 having different materials using a metal material in the axial directions of the stator bobbin 300 and the rotor bobbin 600, thereby securing high efficiency and stiffness with respect to an external impact.

In addition, a strong coupling structure having easy of assembly may be provided by using properties of a metal material by assembling the second rotor core 800 and the rotor cover 420 made of a metal material through the coupling member B in the axial direction of the housing 100.

Furthermore, according to the present invention, since a non-directional section is formed in a section, in which a magnetic field is curved, by using a support block, it is possible to constantly maintain the directionality of the magnetic flux.

According to the present invention, a portion having low stiffness during a high speed rotation may be reinforced by respectively assembling different material cores using a metal material in axial directions of a stator bobbin and a rotor bobbin. Accordingly, it is possible to secure high efficiency and stiffness with respect to an external impact.

In addition, according to the present invention, a strong coupling structure having easy of assembly may be provided by using properties of a metal material by assembling a core and a rotor cover made of a metal material through a coupling member in an axial direction of a housing.

Furthermore, according to the present invention, since a non-directional section is formed in a section in which a magnetic field is curved, by using a support block, it is possible to constantly maintain directionality of the magnetic flux.

While the embodiments of the present invention have been described with reference to the specific embodiments, it will be apparent to those skilled in the art that various changes and modifications may be made without departing from the spirit and scope of the invention as defined in the following claims.

Therefore, the scope and sprit of the invention should be defined by the appended claims and equivalents thereof.

It should be understood that these embodiments are provided for illustration only and are not to be construed in any way as limiting the present invention, and that the scope of the present invention is defined only by the accompanying claims. All modifications, changes, and alterations deduced from the claims and their equivalents fall within the scope of the present invention.

DESCRIPTION OF REFERENCE NUMERALS

| | |
|---|---|
| 100: housing | 110: stepped portion |
| 120: stator cover | 200: first stator core |
| 300: stator bobbin | 310: stator coil |
| 400: rotor | 410: shaft |
| 411: bearing | 420: rotor cover |
| 421: cover body | 422: support part |
| 422a: coupling groove | 423: support protrusion |
| 500: first rotor core | 600: rotor bobbin |
| 610: rotor coil | 700: second stator core |
| 800: second rotor core | 810: coupling hole |

What is claimed is:

1. A field winding type motor comprising:
    a rotor rotatably coupled in a hollow of a housing;
    a first stator core coupled along an inner peripheral surface of the housing;
    a first rotor core coupled along an outer peripheral surface of the rotor in a state of being spaced apart from an inner peripheral surface of the first stator core;
    a bobbin assembly coupled along a gap between the first stator core and the first rotor core and generating a magnetic flux when power is applied thereto;
    a second stator core fixedly disposed on an one side of the bobbin assembly in an axial direction in a state of being coupled along the inner peripheral surface of the first stator core; and
    a second rotor core disposed on the other surface of the bobbin assembly so as to correspond to the second stator core and rotated together with the first rotor core when the power is applied to the bobbin assembly.

2. The field winding type motor according to claim 1, wherein the bobbin assembly comprises:
    a stator bobbin coupled along the inner peripheral surface of the first stator core and comprising stator coils wound therearound; and
    a rotor bobbin rotatably disposed within an inner diameter of the stator bobbin in a state of being coupled along an outer peripheral surface of the first rotor core and comprising rotor coils wound therearound.

3. The field winding type motor according to claim 1, wherein the rotor comprises:
    a shaft installed to be rotatable on a central axis line of the hollow; and
    a rotor cover coupled to the outer peripheral surface of the rotor and supporting one surface of the second rotor core in an axial direction toward the bobbin assembly.

4. The field winding type motor according to claim 3, wherein the rotor cover comprises:
    a cover body coupled along a gap between the shaft and the first rotor core in an axial direction of the housing; and
    a support part bent in a radial direction of the shaft from one end in an axial direction of the cover body and closely contacting one surface of the second rotor core in an axial direction.

5. The field winding type motor according to claim 4, wherein the second rotor core and the support part are coupled through a coupling member, and
    the coupling member is screw-coupled to the second rotor core and the support part in an axial direction thereof.

6. The field winding type motor according to claim 4, wherein the rotor cover has a support protrusion protruding along a connection portion between an outer peripheral surface of the cover body and the support part, and
    one surface of the support protrusion in an axial direction closely contacts one surface of the first rotor core in an axial direction and an outer peripheral surface of the support protrusion supports an inner peripheral surface of the second rotor core, so that the first rotor core and the second rotor core are spaced apart from each other in the axial direction thereof.

7. The field winding type motor according to claim 4, wherein a stator cover is further coupled to one surface of the housing in the axial direction, the support part being disposed on an inner peripheral surface of the stator cover, and one surface of the stator cover in an axial direction closely contacts one surface of the first stator in an axial direction.

8. The field winding type motor according to claim 1, wherein a material of the second stator core and the second rotor core is different from a material of the first stator core and the first rotor core.

9. The field winding type motor according to claim 1, wherein a material of the second stator core and the second rotor core has a relatively higher strength than that of a material of the first stator core and the first rotor core.

10. The field winding type motor according to claim 1, wherein the first stator core and the first rotor core comprise a soft magnetic composite (SMC) material, and the second stator core and the second rotor core comprise a stainless material.

\* \* \* \* \*